Nov. 20, 1956  M. E. FLEMING  2,771,085
DENTAL CLEANER
Filed Sept. 25, 1953
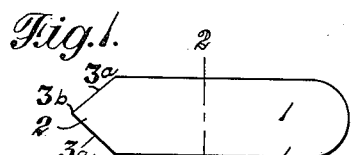
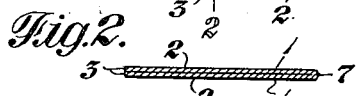
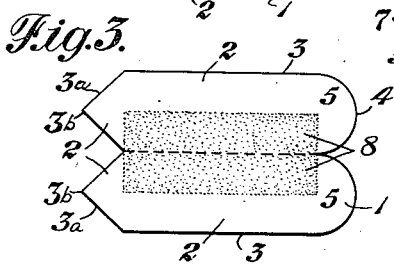
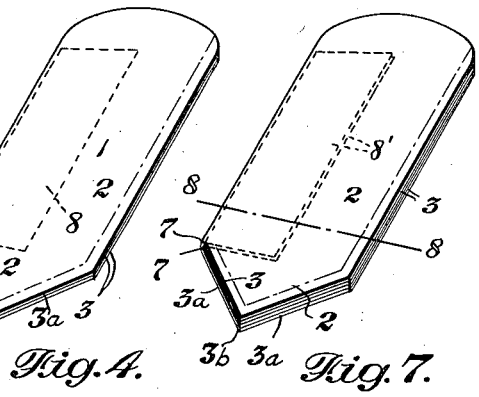
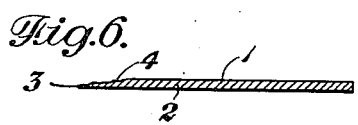
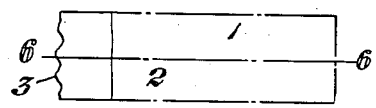
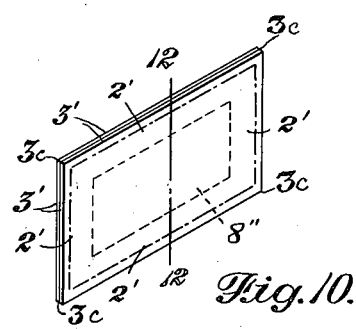
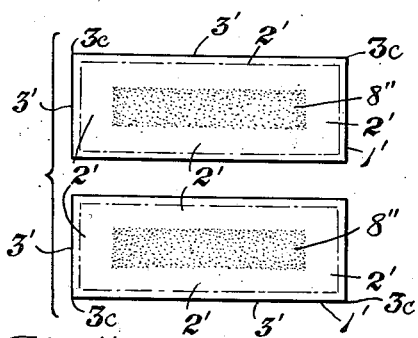
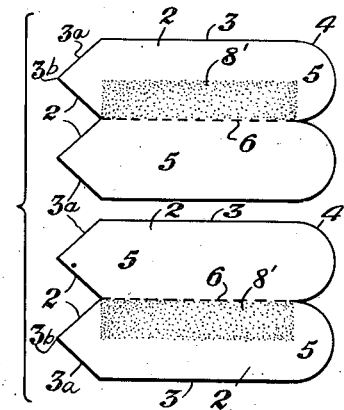
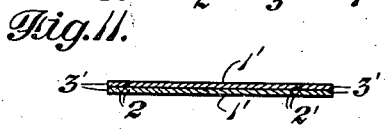
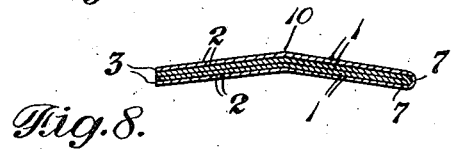
INVENTOR
Margaret Ellen Fleming,
George M. Anderson.
BY
ATTORNEY United States Patent Office 2,771,085
Patented Nov. 20, 1956

2,771,085

DENTAL CLEANER

Margaret E. Fleming, Niagara Falls, N. Y., assignor to John S. Fleming, Niagara Falls, N. Y.

Application September 25, 1953, Serial No. 382,366

7 Claims. (Cl. 132—89)

The invention relates to dental cleaners for dislodging food particles from between adjacent teeth, this application being related to the application Serial Number 220,063, filed April 9, 1951, patented June 28, 1955, for Manicure Tool, No. 2,711,747. Known dental cleaners comprise tooth picks of various kinds, dental floss, and dental ribbons the wax impregnated threads of which are bonded together by the wax, all of which tend to injure or cut the gums for lack of a flexible base yieldable in the direction of pressure thereof against the gums and having a soft self-cushioned edge.

An object of the invention is to provide a dental cleaner consisting of a plurality of superposed identical layers of flexible paper, the peripheral portions of which comprise a set of superposed tongues each of which has a soft self-cushioned edge resulting from tearing the related layer from and along a weakened tear line of a sheet of said paper, said set of tongues being movable between adjacent teeth with their soft edges pressed vertically against the gums, the soft edges of the plural tongues having collectively a brushing action during such movement. Other objects and advantages will appear hereinafter or will be obvious.

The invention consists in the novel construction and combinations of parts as hereinafter set forth in the claims.

In the accompanying drawings,

Figure 1 is a plan view of an embodiment of the dental cleaner.

Figure 2 is a section on the line 2—2, Figure 1, on an enlarged scale.

Figure 3 is a plan view of the blank for making the same.

Figure 4 is a perspective view of the dental cleaner on an enlarged scale.

Figure 5 is a plan view of a fragment of the paper, showing on a much enlarged scale the irregularly outlined soft edge, resulting from tearing the related layer from and along a weakened tear line of a sheet of said paper.

Figure 6 is a section on the line 6—6, Figure 5, showing the soft edge beveled upon one side thereof.

Figure 7 is a view similar to Figure 4, showing the dental cleaner made from a plurality of the folded blanks.

Figure 8 is a section on the line 8—8, Figure 7 on an enlarged scale, of the dental cleaner modified to show the central longitudinal crease.

Figure 9 is a plan view of the blanks for making the dental cleaner shown in Figure 7.

Figure 10 is a perspective view of another embodiment of the dental cleaner.

Figure 11 is a plan view of the blanks for making the same.

Figure 12 is a section on the line 12—12, Figure 10, on an enlarged scale.

Referring to the drawings, Figures 1 to 9, the dental cleaner is shown as consisting of a plurality of superposed identical layers 1 of flexible paper, the lower longitudinal peripheral portions of said layers consisting of a plurality of superposed tongues 2, having straight edges 3 extending longitudinally of the cleaner, the forward peripheral portions of said layers consisting of a plurality of superposed tongues 2a, having converging forward edges 3a, extending transversely of the cleaner and intersecting in points 3b, the edges of the tongues of each set being each a soft self-cushioned edge beveled at 4 upon one side thereof resulting from tearing the related layer from and along a weakened tear line of a sheet of said paper, paper fold means 7 connecting said layers together back of the tongues of each set and extending along the upper longitudinal edges of said layers, the tongues of each set having their adjacent surfaces free of connection with one another, each set of tongues being movable between adjacent teeth with their soft edges pressed against the gums, the soft edges of the plural tongues of each set having collectively a brushing action during such movement.

Referring to Figure 3, the cleaner may be made from a blank 4, having two identical subdivisions 5, said blank being folded at 6 to superpose one of its subdivisions as a layer upon the other, locate said layers, tongues and soft edges adjacent each other and provide the paper fold 7 connecting the layers together. Adhesive means 8 may also be used for connecting said layers together back of said tongues. Referring to Figure 9, the cleaner may be made from a plurality of identical blanks 4, each blank having two identical subdivisions 5, each blank being folded at 6 to superpose one of its subdivisions as a layer upon the other, locate the layers, tongues and soft edges adjacent each other and provide the paper fold 7 connecting the layers together, the folded blanks being interfitted to provide a multiple fold cleaner, adhesive means 8' being used to connect the interfitted folded blanks together.

A second embodiment of the invention is shown in Fig. 10, in which the cleaner is made from a plurality of identical superposed quadrilateral layer 1' of said paper, the peripheral portions of said layers consisting of four sets of superposed tongues 2', the edge of each tongue of each set being a soft self-cushioned edge beveled upon one side thereof resulting from tearing the related layer from and along a weakened tear line of a sheet of said paper, the soft edges of the tongues of each layer intersecting in four points 3c, adhesive means 8" connecting said layers together back of said tongues, of said sets, the tongues of each set having their adjacent surfaces free of connection with one another, the tongues of each set being movable between adjacent teeth with their soft edges pressed against the gums, the soft edges of the plural tongues of each set having collectively a brushing action during such movement. Said layers 1' may be elliptical, circular or other suitable pattern.

The tongues of each set of both embodiments of the invention are each individually yieldable backwardly thereof and adapted to bear only a part of the pressure load transmitted thereto through its soft edge, the plural tongues of each set being collectively less yieldable and adapted to bear the entire load, which is distributed therebetween so that they are collectively self-cushioned.

The dental cleaner may be centrally longitudinally creased at 10, Figure 8, to make it somewhat concavo-convex, stiffen it, and aid in holding it in form, inasmuch as it is necessarily quite thin.

The paper is thin to enable it to be movable between adjacent teeth, it is flexible to enable the dental cleaner to be flexed during such movement, and to enable said tongues to be individually and collectively yieldable backwardly thereof during such movement, it is sized to resist penetration of the moisture of the saliva, and it is calendered between calender rollers to make it smooth and compact, increase its tensile strength and provide an adequate soft edge. The paper should not be so thin as to provide an inadequate soft edge.

The right is reserved to modifications coming within the scope of the claims, and to any other uses for which the invention is adapted, such for example as cleaning between the edges of the finger nail and the adjacent cuticle and to cleaning under the eyelids.

I claim:

1. A self-cushioned dental cleaner, consisting of a plurality of superposed identical layers of flexible paper, the peripheral portions of said layers comprising a set of superposed tongues, each of said tongues having a soft self-cushioned edge beveled upon one side thereof resulting from tearing the related layer from and along a weakened tear line of a sheet of said paper, and paper fold means for connecting said layers together back of said tongues, said tongues having their adjacent surfaces free of connection with one another, said set of tongues being movable between adjacent teeth with their soft edges pressed against the gums, the soft edges of the plural tongues having collectively a brushing action during such movement.

2. A self-cushioned dental cleaner, consisting of a plurality of superposed identical layers of flexible paper, the lower longitudinal peripheral portions of said layers consisting of a set of superposed tongues, each of said tongues having a soft self-cushioned edge beveled upon one side thereof resulting from tearing the related layer from and along a weakened tear line of a sheet of said paper, and paper fold means for connecting said layers together back of said tongues and along their upper longitudinal edges, said tongues having their adjacent surfaces free of connection with one another, said set of tongues being movable between adjacent teeth with their soft edges pressed against the gums, the soft edges of the plural tongues having collectively a brushing action during such movement.

3. A self-cushioned dental cleaner, consisting of a plurality of superposed identical layers of flexible paper, the lower longitudinal peripheral portions of said layers consisting of a set of superposed tongues having straight edges extending longitudinally of the cleaner, the forward peripheral portions of said layers consisting of a set of superposed tongues having converging forward edges extending transversely of the cleaner and intersecting in points, the edges of the tongues of each set being each a soft self-cushioned edge beveled upon one side thereof resulting from tearing the related layer from and along a weakened tear line of a sheet of said paper, and paper fold means for connecting said layers together back of said tongues and along the upper longitudinal edges of said layers, the tongues of each set having their adjacent surfaces free of connection with one another, each set of tongues being movable between adjacent teeth with their soft edges pressed against the gums, the soft edges of the plural tongues of each set having collectively a brushing action during such movement.

4. A self-cushioned dental cleaner as defined in claim 1, in which the tongues of said set are each individually yieldable backwardly thereof and adapted to bear only a part of the pressure load, transmitted thereto through its soft edge, the plural tongues of said set being collectively less yieldable and adapted to bear the entire load, which is distributed therebetween, so that they are collectively self-cushioned.

5. A self-cushioned dental cleaner, as defined in claim 3, in which the cleaner is made from a blank having two identical subdivisions, said blank being folded to superpose one of its subdivisions as a layer upon the other, locate said layers and said tongues and said soft edges adjacent one another and provide the paper fold connecting said layers together.

6. A self-cushioned dental cleaner as defined in claim 3, in which the cleaner is made from a plurality of identical blanks, each blank having two identical subdivisions, and being folded to superpose one of its subdivisions as a layer upon the other, locate said layers, said tongues and said soft edges adjacent each other and provide the paper fold connecting the layers together, the folded blanks being interfitted to provide a multiple fold cleaner, and adhesive means for connecting the interfitted folded blanks together, back of said tongues.

7. A self-cushioned dental cleaner, consisting of a plurality of superposed identical quadrilateral layers of flexible paper, the peripheral portions of said layers consisting of four sets of superposed tongues, the edge of each tongue of each set being a soft self-cushioned edge beveled upon one side thereof resulting from tearing the related layer from and along a weakened tear line of a sheet of said paper, the soft edges of the tongues of each layer intersecting in points, and adhesive means for connecting said layers together back of the tongues of said sets, the tongues of each set having their adjacent surfaces free of connection with one another, the tongues of each set being movable between adjacent teeth with their soft edges pressed against the gums, the soft edges of the plural tongues of each set having collectively a brushing action during such movement.

References Cited in the file of this patent

FOREIGN PATENTS

| | | |
|---|---|---|
| 268,022 | Germany | Dec. 6, 1913 |
| 589,016 | Great Britain | June 9, 1947 |